(12) United States Patent
Todd et al.

(10) Patent No.: US 12,224,997 B2
(45) Date of Patent: Feb. 11, 2025

(54) MULTI-WAY TRUST FORMATION IN A DISTRIBUTED SYSTEM

(71) Applicant: HITACHI VANTARA LLC, Santa Clara, CA (US)

(72) Inventors: Andrew Todd, Cambridge, MA (US); Walter Wohler, Longmont, CO (US); Marty Kulma, Auburn, MA (US); Richard Bramante, Methuen, MA (US)

(73) Assignee: HITACHI VANTARA LLC, Santa Clara, CA (US)

( * ) Notice: Subject to any disclaimer, the term of this patent is extended or adjusted under 35 U.S.C. 154(b) by 477 days.

(21) Appl. No.: 17/420,156

(22) PCT Filed: Mar. 4, 2019

(86) PCT No.: PCT/US2019/020503
§ 371 (c)(1),
(2) Date: Jul. 1, 2021

(87) PCT Pub. No.: WO2020/180292
PCT Pub. Date: Sep. 10, 2020

(65) Prior Publication Data
US 2022/0070161 A1    Mar. 3, 2022

(51) Int. Cl.
*H04L 29/06*    (2006.01)
*H04L 9/40*    (2022.01)

(52) U.S. Cl.
CPC ...... *H04L 63/0823* (2013.01); *H04L 63/0435* (2013.01); *H04L 63/0876* (2013.01); *H04L 63/20* (2013.01)

(58) Field of Classification Search
CPC ............ H04L 63/0823; H04L 63/0435; H04L 63/0876; H04L 63/20; G06F 21/33; G06F 21/606; H04W 12/069
See application file for complete search history.

(56) References Cited

U.S. PATENT DOCUMENTS 10,430,786 B1 * 10/2019 Camacho ............ H04L 63/0823
10,938,555 B2 * 3/2021 Foerder ................. H04L 9/3273
(Continued)

FOREIGN PATENT DOCUMENTS

CN    1885771 B    9/2010

OTHER PUBLICATIONS

Japanese Office Action received in corresponding Japanese Application No. 2021-549413 dated Sep. 13, 2022.
(Continued)

Primary Examiner — Shin-Hon (Eric) Chen
Assistant Examiner — Vladimir I Gavrilenko
(74) Attorney, Agent, or Firm — MATTINGLY & MALUR, PC

(57) ABSTRACT

In some examples, a first computing device associated with a first site may receive a certificate of a second computing device associated with a second site that is different from the first site. The first computing device may send, to the second computing device, a credential of a user associated with the second site. In addition, the first computing device may send to the second computing device, a certificate of the first computing device. Furthermore, based at least on authentication of the credential of the user by the second computing device, trusted communications may be established between the first computing device and the second computing device.

20 Claims, 7 Drawing Sheets

(56) References Cited

U.S. PATENT DOCUMENTS

| | | | |
|---|---|---|---|
| 11,039,020 B2* | 6/2021 | Raleigh | H04W 12/088 |
| 2006/0294366 A1 | 12/2006 | Nadalin et al. | |
| 2013/0212663 A1 | 8/2013 | Edge et al. | |
| 2014/0351586 A1 | 11/2014 | Hook et al. | |
| 2015/0350198 A1 | 12/2015 | Li et al. | |
| 2015/0365473 A1 | 12/2015 | Zuerner | |
| 2018/0367533 A1 | 12/2018 | Ellingson et al. | |
| 2020/0252400 A1* | 8/2020 | Pike | H04L 63/0884 |

OTHER PUBLICATIONS

Extended European Search Report received in corresponding European Application No. 19917886.4 dated Sep. 19, 2022.

Manulis, M. et al., "Secure Modular Password Authentication for the Web Using Channel Bindings", International Journal of Information Security, Sep. 21, 2016, pp. 597-620, vol. 15, No. 6.

International Search Report and Written Opinion of the International Searching Authority of PCT/US2019/020503 dated May 16, 2019.

Chinese Office Action received in corresponding Chinese Application No. 201980093509.6 dated Oct. 31, 2023.

* cited by examiner

MULTI-WAY TRUST FORMATION IN A DISTRIBUTED SYSTEM

TECHNICAL FIELD

This disclosure relates to the technical field of secure communications.

BACKGROUND

Creating a secure communication channel between two or more computer systems may be challenging. For instance, typical techniques for securing communications between two computer systems may include exchanging cryptographic keys between the systems. In some conventional techniques, establishing two-way trust between two computer systems may require that a token, cryptographic key, or the like, be exchanged in both directions. Furthermore, existing techniques may require manual administrator intervention to upload keys at each site or may include implementing a centralized key management server. Centralized key management servers have disadvantages, such as posing a single point of failure, while manual cross site key uploads may be tedious tasks for system administrators or other users.

SUMMARY

Some implementations include establishing a trusted communication relationship between two or more computing devices. In some examples, a first computing device associated with a first site may receive a certificate of a second computing device associated with a second site that is different from the first site. The first computing device may send, to the second computing device, a credential of a user associated with the second site. In addition, the first computing device may send to the second computing device, a certificate of the first computing device. Furthermore, based at least on authentication of the credential of the user by the second computing device, trusted communications may be established between the first computing device and the second computing device.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DESCRIPTION OF THE EMBODIMENTS

Figure 1:
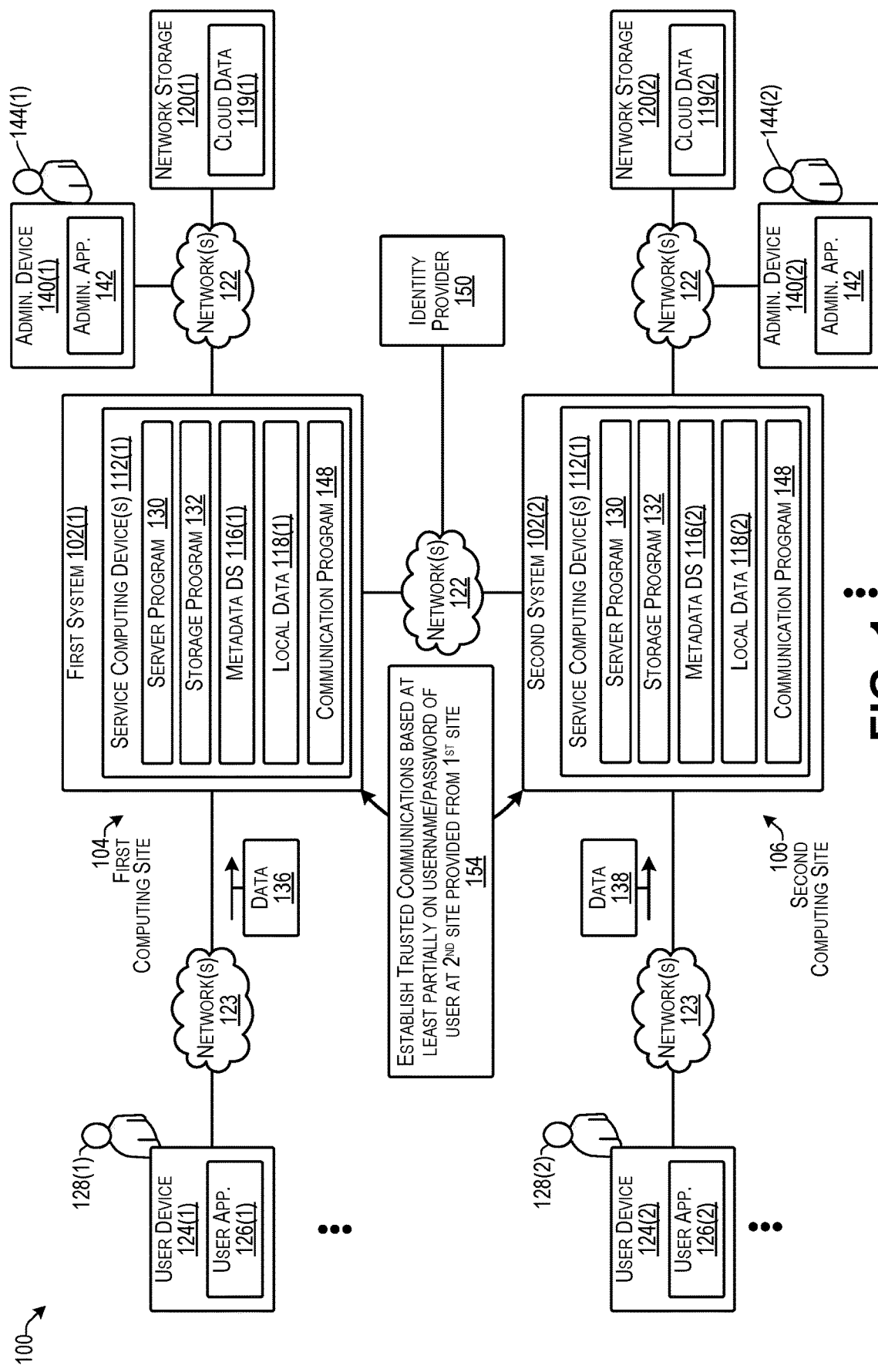
FIG. 1 illustrates an example architecture of a distributed computing system according to some implementations.

Some implementations herein are directed to techniques and arrangements for establishing trust for securing communications between multiple computing systems in a manner that minimizes administrator intervention and that does not employ a centralized key management server. For instance, the multiple computing systems may be physically located at separate sites, or may be otherwise separate computing systems, and may be placed into communication with each other to form a federation of computing systems such that the separate computing systems are able to communicate securely with each other, such as for exchanging data, metadata, and other types of communications. The techniques herein avoid requiring all parties to have administrators upload public keys of all other parties and avoid the need for a centralized key management system. In some cases herein, the trust establishment process may be simplified to include a public certificate upload on only one site amongst a multiple-computer-system federation.

As one example, a single user, such as administrator, from a single location can establish a secure two way communication channel between two independent clusters or other autonomous computing sites, such as for forming a federation. For instance, the two separate computing clusters may be able to communicate over an insecure wide-area network such as the Internet to form a single geographically dispersed larger cluster or federated system.

Initially, suppose that a first system at a first site and a second system at a second site are separate systems that use the same identity provider, and a user wants to establish trusted communications between the first site and the second site. The authenticity of communications from the first site to the second site may be established by downloading, at the first site, a public certificate of the second site, e.g., from a public certificate authority, and sending, by the first site the public certificate of the second site over to the second site. At this time, the authenticity of the first site is proven to the second site, but the authenticity of communications received at the first site from the second site is not proven. Once the authenticity of the first site is proven, the second site can confidently send information to the first site, but not vice versa. At this point, if the first site and the second site are connected to the same identity provider, the user can send a user name and password that should work at both the first site and the second site. If the username and password is authenticated at the first site, then the authenticity of the second site is proven to the first site. Thus, two-way trust is established and the first site may subsequently provide its public certificate to the second site. Subsequently, the two sites may communicate using encrypted communications based on the public certificates.

In implementations herein, two aspects may be involved, e.g., an identity verification aspect and a key management aspect. The identity may only be used for authenticating the initial conversation to provide a certificate, and is not required after that point, as subsequent communications may be based on exchanged public certificates that can be received from the respective site, rather than from a certificate authority or the like. Because the username and password are not sent to the first site until a one-way trust has been established, there is no risk of exposing the username and password to an un-trusted system. In order for the first site to trust the second site, the first site may authenticate and trust communications based on the supplied username and password. In this manner, two-way trust can be achieved and exchanged certificates can be trusted.

Furthermore, in the case of a site joining an already-established federation of a plurality of systems at a plurality of distributed sites, the site wishing to join need only establish trusted communications with one of the member sites to join the federation and, following establishment of two-way trust with the one member, as discussed above, may receive, from the one member, and may therefore trust, the public certificates for all of the members of the federation. Consequently, implementations herein significantly reduce the amount of effort for connecting a plurality of autonomous computing sites for trusted communications and obtaining certificates for a plurality of sites.

Additionally, in some cases, a TLS (Transport Layer Security) connection may be used by a first site to obtain the public certificate of a second site. Following receipt of the public certificate of the second site, the first site trusts communications from the second site, but the second site does not have any reason to trust communications from the first site. The first site may send a username/password of a user at the second site to the second site. Upon authentication, the second site may trust the communications from the first site. The first site may send its own public certificate to the second site either with the username/password or following authentication of the username/password. Subsequently, the two sites may communicate using encrypted communications based on the exchanged public certificates.

Implementations herein may be applied in any situation where a multi-site trust relationship is to be established and where it is not desirable or possible to manually install trusted keys on all sites or delegate responsibility to a centralized key management server. As one example, the techniques herein may be employed for establishing trusted communications in a multi-site distributed system that includes replication of stored data and/or metadata across multiple computing sites physically remote from each other and/or stored on cloud storage or other network storage locations. Additionally, as another example, the techniques may be employed with any federated distributed computing system where a multi-site trust relationship is to be established and where it is not desirable or possible to manually install trusted keys on all sites or use a key management server.

For discussion purposes, some example implementations are described in the environment of one or more service computing devices in communication with one or more other service computing devices such as for storage of data. However, implementations herein are not limited to the particular examples provided, and may be extended to other types of computing system architectures, other types of computing environments, other types of client configurations, other types of cryptographic instruments, other types of data, and so forth, as will be apparent to those of skill in the art in light of the disclosure herein.

FIG. 1 illustrates an example architecture of a distributed computing system 100 according to some implementations. In some cases, the distributed computing system 100 may be configured for storing data, such as object data, but implementations herein are not limited to such a use or configuration. In the example of FIG. 1, a plurality of systems 102(1), 102(2), . . . , are arranged in the distributed computing system 100 at a plurality of respective computing sites 104, 106, . . . . For example, a first system 102(1) may be located at a first computing site 104 and a second system 102(2) may be located at a second computing site 106. Furthermore, while two systems 102(1), 102(2) and computing sites 104, 106 are illustrated in this example, the number of systems and computing sites in other examples is not limited to two, and may be two or more systems and/or sites, such as ranging between two and several hundred systems and/or sites.

Each system 102 may include at least one service computing device 112. Accordingly, one or more service computing devices 112(1) may be included in the first system 102(1) and one or more service computing devices 112(2) may be included in the second system 102(2). As one example, each system 102 may be a cluster of service computing devices that operate autonomously in relation to the other systems 102. Thus, the systems 102 in the examples herein may authenticate communications with each other for enabling secure and trusted communications between the systems 102 at different sites. Further, the systems 102 are not limited to the hardware configurations described and illustrated in this disclosure, but may include any suitable or desired hardware configuration able to perform the functions described herein, and the hardware configuration at one of the systems 102 may be different from that at another one of the systems 102.

In some cases, the service computing devices 112 in each system 102(1) and 102(2) may include, maintain, or otherwise access a metadata data structure (DS) 116(1) and 116(2), respectively, that is used to store metadata about local data 118(1) and 118(2), respectively, that is stored locally at the respective systems 102(1) and 102(2), and cloud data 119(1) and 119(2), respectively, that is stored at respective network storages 120(1) and 120(2). For example, the metadata data structure 116 may be a database, a table, or any other suitable data structure. In the case of object storage, the metadata included in the metadata data structure 116 may include information about each respective stored object, such as path, name, owner, hash value determined from the object data, and so forth.

The systems 102(1) and 102(2) are able to communicate with each other over one or more networks 122. The one or more networks 122 may include any suitable network, including a wide area network (WAN), such as the Internet; a local area network (LAN), such as an intranet; a wireless network, such as a cellular network, a local wireless network, such as Wi-Fi, and/or short-range wireless communications, such as BLUETOOTH®; a wired network including Fibre Channel, fiber optics, Ethernet, or any other such network, a direct wired connection, or any combination thereof. Accordingly, the one or more networks 122 may include both wired and/or wireless communication technologies. Components used for such communications can depend at least in part upon the type of network, the environment selected, or both. Protocols for communicating over such networks are well known and will not be discussed herein in detail. Accordingly, the service computing devices 112 are able to communicate over the one or more networks 122 using wired or wireless connections, and combinations thereof.

In addition, at least some of the service computing devices 112 are able to communicate with a plurality of user devices 124(1), 124(2), . . . , through one or more networks 123. Each user device 124(1), 124(2) may include a respective instance of a user application 126(1), 126(2) that may execute on the respective user device 124(1), 124(2), such as for communicating with a respective service computing device 112, e.g., for sending data for storage by the systems 102 and/or for retrieving stored data from the systems 102. Users 128(1), 128(2) may be associated with the respective user devices 124(1), 124(2). In some cases, the application 126 may include a browser or may operate through a browser, while in other cases, the application 126 may include any other type of application having communication functionality enabling communication with the service computing devices 112 over the one or more networks 123.

The one or more networks 123 may be a LAN in some examples. In other examples, the one or more networks 123 may be any of the networks discussed above with respect to the one or more networks 124. In some cases, the users 128 and/or the user devices 124 or user applications 126 may be assigned to access the service computing device(s) 112 at a particular computing site 104 or 106 of the plurality of computing sites. For example, if the first computing site 104 is located in Boston, and the first user 128(1) is an employee who works in the Boston area, the first user 128(1) may be assigned to access the service computing device(s) 112(1), rather than the other service computing devices 112(2) at the second computing site 106.

In some examples, various users 128 or groups of users 128 may only be granted access to certain ones of the service computing device(s) 112 at certain ones of the computing sites 104 or 106, such as for load balancing, limiting employee access to a local office system, and so forth. Furthermore, while two systems 102(1) and 102(2) and computing sites 104 or 106 are shown in this example, in other examples, a different number of systems/storage locations may be used, such as more than two, with the upper limit being based on practicality and diminishing returns, rather technical feasibility.

In addition, the first system 102(1) may be able to communicate over the one or more networks 122 with the first network storage 120(1), and the second system 102(2) may be able to communicate over the one or more networks 122 with the second network storage 120(2) that may be different from the first network storage 120(1). For example, the first network storage 120(1) may be geographically remote from the second network storage 120(2). In some cases, the network storages 120(1) and 120(2) may be referred to as "cloud storage" or "cloud-based storage", and may enable a lower cost storage solution per megabyte/gigabyte than the local storage at the service computing devices 112.

At least some of the service computing devices 112 may include a server program 130 and a storage program 132. For instance, the server program 130 may interact with the user devices 124 for receiving data from the user devices 124 and serving data to the user devices 124. The storage program 132 may manage the storage of data locally and at the network storage 120. In addition, the storage program 132 may manage and maintain the metadata data structure 116 for the respective data managed by the respective system 102.

As one example, suppose that the first user 128(1) uses the first system 102(1) for storage of data. For instance, the first user 128(1) may send data 136 to the service computing device 112(1) for storage by the first system 102(1). Similarly, the second user 128(2) may use the second system 102(2) for storage of data. For instance, the second user 128(2) may send data 138 to the service computing device 112(2) for storage by the second system 102(2). Furthermore, the user computing devices 124 may communicate with the respective service computing devices 112 to receive data from the respective service computing devices through interaction with the server program 130.

The distributed computing system 100 herein may be deployed in a geographically distributed manner, such as for data recovery and/or concurrent access purposes. As one example, the distributed computing system 100 may include a geographically dispersed replicated environment in which multiple systems 102 replicate data for each other in a wide area network topology. In addition, each system 102(1) and 102(2) may include, or may otherwise be in communication with, an administrator device 140(1) and 140(2), respectively. Each administrator device 140(1) and 140(2) may execute an administrator application 142 that enables an administrator 144(1) and 144(2), respectively, to manage the systems 102(1) and 102(2), respectively.

To enable trusted communications over an unsecured network between the distributed autonomous computing systems 102, such as for forming a federation among two or more of the distinct systems 102, trusted communication channels may be established, such as for enabling encrypted communications, exchanging data, replicating data, enabling management communications, and so forth. One or more of the service computing devices 112 at each system 102 may include a communication program 148. In some examples, the communication program 148 may be a module of the storage program 132 or the server program 130, while in other examples, the communication program 148 may be separate from the storage program 132 and the server program 130. As discussed additionally below, the communication program 148 may be executed at the systems 102 to perform the trusted communications between the systems 102 based on the trusted communications established between the computing systems 102. For example, an administrator 144 or other user 128 might initiate the process for establishing trusted communications that are performed using the communications program 148.

In some examples, the first system 102(1) and the second system 102(2) may use the same identity provider 150. The identity provider 150 may be a system entity that creates, maintains, and manages identity information for administrators and other user and while providing authentication services to applications within a federation or distributed computing system. The identity provider 150 may be a trusted system that authenticates users for the systems 102. For example, credentials provided by a user may be redirected to the identity provider 150 for authentication. Following identification, the identity provider 150 may provide an encoded message, e.g., to an application that submitted the credentials, to indicate whether the credentials are authentic and valid. Further, the identity provider 150 may provide a central audit trail of all access events and may provide added layers of security to safeguard credentials against phishing, malware, credential database breaches, and the like.

In this example, as indicated at 154, trusted communications may be established between the first system 102(1) and the second system 102(2) based at least partially on a username and password of a user at the second system 102(2), provided from the first system 102(1), or vice versa. For instance, as discussed in additional detail below, one-way trust may first be established between the first system 102(1) and the second system 102(2), such as based on a public certificate of one of the systems 102 that may be obtained by an administrator 144, e.g., from a certificate authority or the like, and uploaded to one of the systems 102(1) or 102(2).

In some cases, the public certificate referred to herein may be an X.509 public key certificate, such as may be used in TLS/SSL secure communications over the Internet and other security applications, such as electronic signatures. For instance, the certificate may contain a public key and an identity (e.g., a hostname, or an organization, or an individual), and may be either signed by a certificate authority or self-signed. When the certificate is signed by a trusted certificate authority, or validated by other means, someone holding that certificate can rely on the public key contained in the certificate to establish secure communications with another party. For instance, a first party that has received the certificate of a second party may use the public key to encrypt communications sent to the second party. The second party may use its private key, corresponding to the public key in the certificate, to decrypt the communications. Alternatively, other types of certificates, public keys, shared secrets, or the like, may be used in other implementations herein as the public certificates.

Based on one way trust being established, the untrusted party may send a username and password of a user at the trusted party to the trusted party. The trusted party may authenticate the username and password, and based on the authentication, may establish trust with the sending party. For example, because the first system 102(1) and the second system 102(2) may use the same identity provider, the credentials of an administrator at the first system 102(1) will work at the second system 102(2) and vice versa.

Alternatively, in other examples, the administrator 144(1) at the first system 102(1) can communicate directly with the administrator 144(2) at the second system 102(2) and may be given credentials for the second system 102(2), or vice versa, over telephone, via email, or by other communication means. As still another alternative, the administrator 144(1) at the first system 102(1) may also be an administrator 144(2) at the second system 102(2) and may already have credentials to the second system 102(2) and/or an identity provider used by the second system 102(2). As still another alternative, the first system 102(1) and the second system 102(2) may share a replicated identity provider (for example active-directory replication) and thus the administrator's credentials that exist on the identity provider at the second system 102(2) may be replicated to an identity provider used by the first system 102(1). Furthermore, the example of FIG. 1 is just one example of a possible configuration of the systems 102 and service computing devices 112. Numerous other configurations will be apparent to those of skill in the art having the benefit of the disclosure herein.

Figure 2:
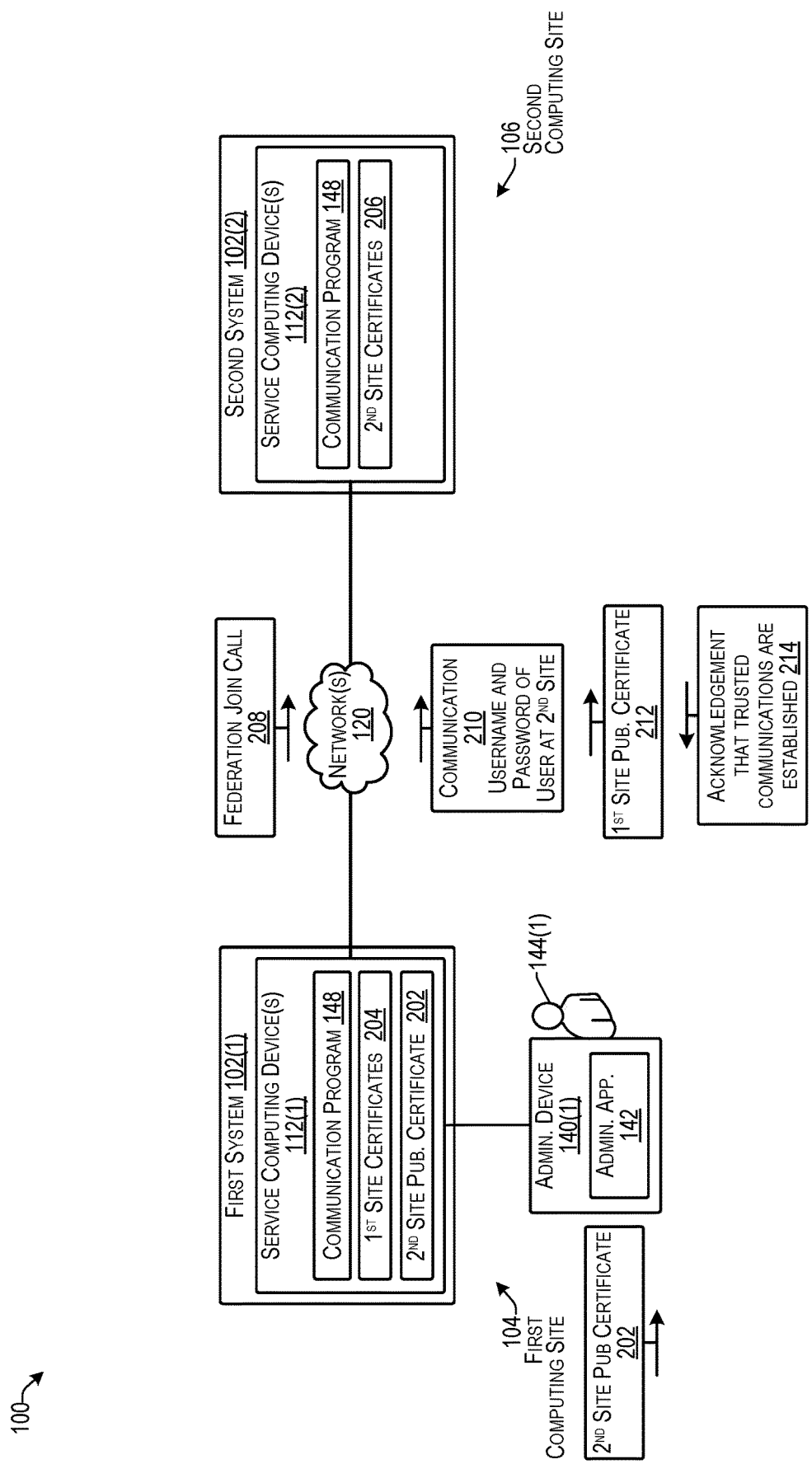
FIG. 2 is a block diagram illustrating an example configuration of establishing trusted communications between two separate systems in a distributed computing system according to some implementations.

FIG. 2 is a block diagram illustrating an example configuration of establishing trusted communications between two separate systems in a distributed computing system 200 according to some implementations. The distributed computing system 200 in this example may correspond to the computing system 100 discussed above, or various other distributed computing systems. In this example, suppose that the administrator 144(1) obtains the second site's certificate 202, such as from a trusted certificate authority, or the like, and uploads the second site certificate 202 to the service computing device 112(1) of the first system 102(1) at the first site 104. Further, the first system 102(1) may already have its own first site certificates 204, i.e., including the public and private keys. Similarly, the second system 102(2) may also already have its own second site certificates 206, including public and private keys.

The administrator 144(1) may send an initial federation-join call 208 which may indicate that the first system 102(1) desires to be federated with the second system 102(2). In some examples, the administrator 144(1) at the first system 102(1) may optionally include the second site public certificate 202, which indicates trust that a response signed with that certificate by can be trusted. This establishes that the first system 102(1) can trust communications received from the second system 102(2). To enable the second system 102(2) to trust communications received from the first system 102(1), the administrator 144(1) may cause the communication program 148 to send, to the second system 102(2), a communication 210 including a username and password of a user authorized to access the second system 102(2).

As mentioned above, various different techniques may be used for obtaining or otherwise providing the username and password, such as the first system 102(1) and the second system 102(2) using the same identity provider. Alternatively, the administrator 144(1) may communicate directly with an administrator (not shown in FIG. 2) at the second system 102(2) to obtain credentials for the second system 102(2). As another alternative, the administrator 144(1) at the first system 102(1) may also be an administrator 144(2) at the second system 102(2). As still another alternative, the first system 102(1) and the second system 102(2) may share a replicated identity provider (for example active-directory replication) and thus the administrator's credentials that exist on the identity provider at the second system 102(2) may be replicated to an identity provider used by the first system 102(1). Various other variations will be apparent to those of skill in the art having the benefit of the disclosure herein.

Because the username and password are not sent to the second system 102(2) until a one-way trust has been established such that the first system 102(1) trusts communications from the second system 102(2), there is no risk of exposing the username and password to an un-trusted system. In order for the second system 102(2) to trust the first system 102(1), the second system 102(2) may authenticate communications based on authentication of the supplied username and password. Following authentication of the supplied username and password, two-way trust is achieved between the first system 102(1) and the second system 102(2). The first system 102(1) may send its own public certificate 212 either with the communication 208, or after receiving, from the second system 102(2), an acknowledgement 214 that trusted communications are established between the second system 102(2) and the first system 102(1).

In an alternative example, rather than obtaining the 2nd site public certificate 202 from a certificate authority, the administrator 144(1) may cause the join federation request 208 to initially make an TSL/SSL call to the second system 102(2) and may receive an SSL error that the certificate presented by the second system 102(2) is not trusted. The first system 102(1) UI may then display this certificate and ask the administrator 144(1) if the 2nd site public certificate is trusted. If it is trusted, then with a single click the administrator 144(1) may retry the request, this time including the 2nd site public certificate 202. Then the second system 102(2) may evaluate and authenticate the username/password provided by the first system 102(1) to establish two-way trust.

In addition, the administrator 144(1) or other authorized user may revoke a trust or certificate at any time. For instance, the authorized user may issue a command to any member of a federation with the trust or certificate to revoke. The system that processes this request may be configured to update the other members of the federation. Additionally, a certificate may expire and invalidate one or more trust relationships. When a trust relationship is lost, communications between the affected systems will fail, preventing further communication until the trust relationship is re-established.

To resolve revocations, an authorized user may repair a revoked trust using a process that is very similar to joining a federation. As one example, the authorized user may first update the certificate(s) used by the affected system, i.e., the system whose certificate has been revoked. The authorized user may then issue a command to join into a trust relationship with one of the members of the federation using valid credentials (e.g., username and password) for the target system. The revoked system may provide its new certificate(s) with the credentials, or alternatively, following establishment of trust with the target system based on the target system authenticating the credentials. As discussed above, the target system may evaluate the credentials and the received certificate(s). If authentication is successful, the target system will update the federation state and respond to the previously revoked system with the federation information and certificates (i.e., certificates of the target system and the certificates of any other members of the federation). At this point, the trust has been re-established and the previously revoked member has rejoined the federation.

Figure 3:
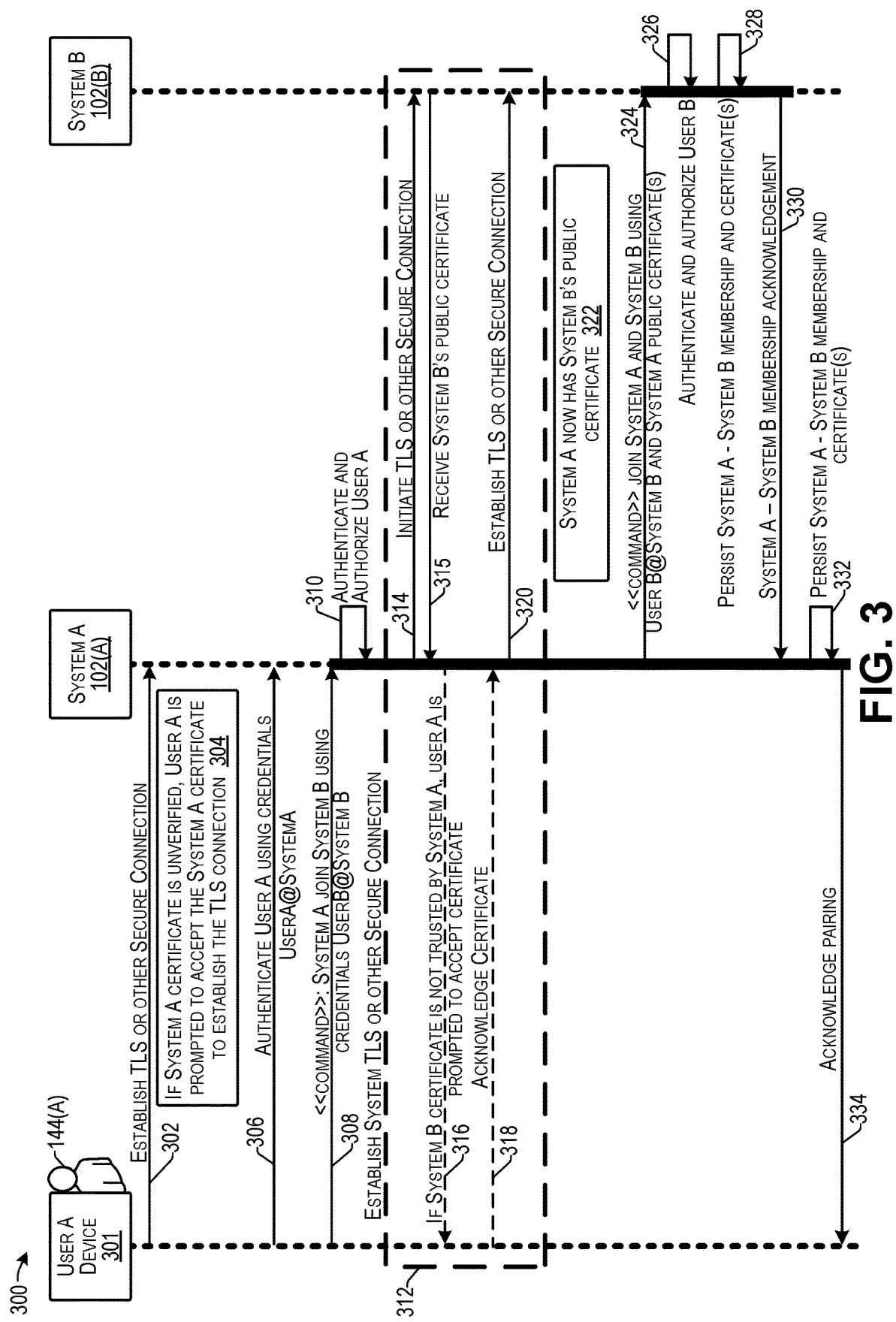
FIG. 3 is a sequence diagram illustrating an example of joining two computing systems for trusted communications, such as in a federation, according to some implementations.

FIG. 3 is a sequence diagram illustrating an example 300 of joining two computing systems for trusted communications, such as in a federation, according to some implementations. In this example, suppose that an authorized user, such as an administrator 144(A) decides to use user A device 301 to establish secure communications between system A 102(A) and system B 102(B). For example, user 144(A) may be an administrator or other authorized user at system A 102(A) with sufficient privileges to establish the trusted communications between the two systems 102(A) and 102(B). Accordingly, user A device 301 may include either the user device 124 or the administrator device 140 discussed the above with respect to FIG. 1.

At 302 the user A device 301 may establish a TLS or other secure connection with system A 102(A), such as by establishing the connection with one of the service computing devices 112 (not shown in FIG. 3) of system 102(A). For instance, the TLS protocol may be used to communicate across a network while preventing eavesdropping and tampering. As one example, the user A device 301 may make a protocol-specific request to system A 102(A) to switch an unsecure connection to a TLS connection, such as by making a "STARTTLS" request, switching a connection to a port number designated for TLS connections, or the like. After user A device 301 and system A 102(A) have agreed to use TLS, they may negotiate the TLS connection by using a handshaking procedure with an asymmetric cipher to establish not only cipher settings but also a session-specific shared key with which further communication is encrypted using a symmetric cipher. During this handshake, the client and server agree on various parameters used to establish the security of the connection. As one example, a Diffie-Hellman key exchange may be used to securely generate a random and unique session key for encryption and decryption. Following the handshake and the generation of the unique session key, the secured connection may be in effect and communications may be encrypted and decrypted using the session key until the connection closes.

At 304, if the certificate of System A is unverified, User A may be prompted to accept the certificate to establish the TLS connection. This may include verification of certificate validity period, certificate chain issuer, certificate revocation lists, and the like.

At 306, user A device 301 may provide credentials to authenticate user A at system A. For example, user A device 301 may provide user A's username and password or other authentication credentials to system A 102(A).

At 308, user A device 301 may implement a command for System A to join System B using credentials of a system B user, such as a username and password of a system B user, which may be an actual system B user, or which may be a username and password associated with an account of a system B user with administrative privileges, but which is just used for authentication at system B. Thus, the username and password might be different each time a trust relationship is established and the user, username, and password might not be used again thereafter.

At 310, system A 102(A) may authenticate and authorize user A on system A 102(A), such as by checking user A's username and password or other authentication credentials provided to system A 102(A) at 306.

At 312, a system TLS connect or other type of secure connection is established between system A 102(A) and system B 102(B) via operations 314-320 below.

At 314, system A initiates a TLS or other secure connection with system B using a technique that may be similar to that discussed above at 302.

At 315, as a result of initiating the secure connection, system A 102(A) may receive system B's public certificate.

At 316, if during the establishment of the secure connection, system B's certificate is not trusted by system A, system A may send a prompt to the administrator 144(a) at the user A device 301 to accept the certificate of system B. This may include verification of certificate validity period, certificate chain issuer, certificate revocation lists, and the like.

At 318, user A device may send a communication to system A 102(A) that acknowledges the validity of the certificate of system B.

At 320, a TLS or other secure connection is established between system A 102(A) and system B 102(B), which may include the establishment of a secure session key between system A 102(A) and system B 102(B).

At 322, system A now has a copy of system B's public certificate as a result of establishing the TLS connection.

At 324, system A sends a command to system B to join system A and system B in a trusted communication arrangement using the credentials of the system B user and the system A public certificate.

At 326, system B 102(B) authenticates and authorizes user B based on the user B credentials received from system A 102(A), and which system A 102(A) received from user A device 301 at 308.

At 328, system B 102(B) persists system A—system B membership and certificate(s) at system B 102(B). For example, system B 102(B) may trust communications from system A based on receiving system A's public certificate and based on authentication of the system B username and password for the system B user.

At 330, system B 102(B) sends to system A 102(A) an acknowledgment that system A—system B membership in a trusted communication relationship has been established.

At 332, system A 102(A) may persist the system A—system B membership and certificate(s).

At 334, system A 102(A) sends an acknowledgement to user A device 301 to acknowledge that the pairing for trusted communications between system A 102(A) and system B 102(B) has been established.

Accordingly, after the trusted communications have been established, system A and system B may comprise a federated computer system in which two separate systems have a trusted communication channel established between them.

Figure 4:
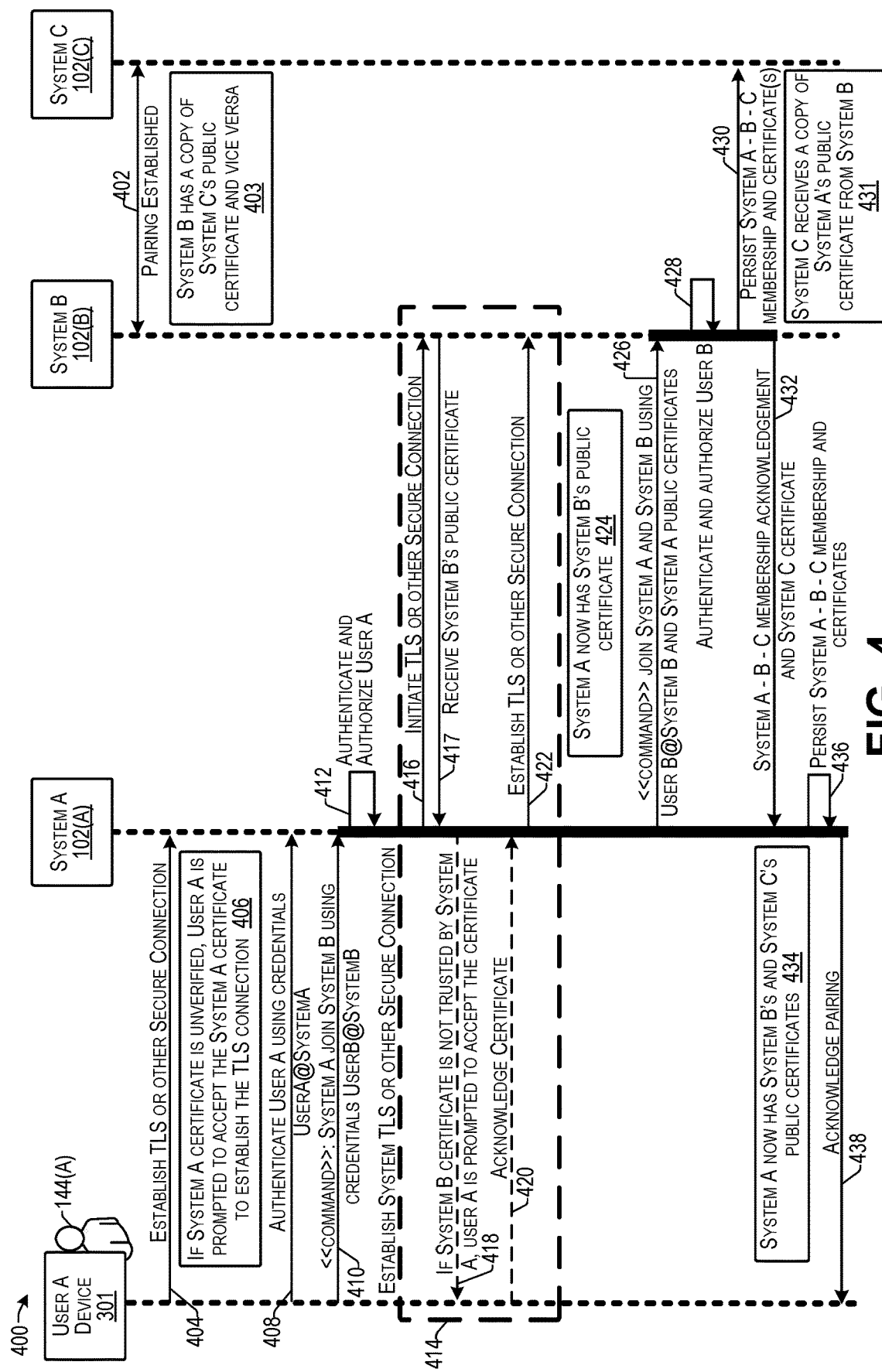
FIG. 4 is a sequence diagram illustrating an example of joining an additional computing system to an existing federation of two computing systems according to some implementations.

FIG. 4 is a sequence diagram illustrating an example 400 of joining an additional computing system to an existing federation of two computing systems according to some implementations. In this example, suppose that user A decides to use user A device 301 to establish secure communications between system A 102(A) and an existing federation including system B 102(B) and system C 102(C). For example, user A may be an administrator or other user at system A 102(A) with sufficient privileges to establish the trusted communications between the system A 102(A) and the existing federation. The user A device 301 may include either the user device 124 or the administrator device 140 discussed the above with respect to FIG. 1.

At 402, suppose that a pairing for trusted communications has already been established between system B 102(B) and system C 102(C), e.g., using the techniques discussed above with respect to FIGS. 1-3.

As indicated at 403, based on the pairing, system B has a copy of system C's public certificate and system C has a copy of system B's public certificate.

At 404 the user A device 301 may establish a TLS (transport layer security) or other secure connection with system A 102(A), such as by establishing the connection with one of the service computing devices 112 (not shown in FIG. 4) of system A 102(A), e.g., as discussed above at 302 of FIG. 3.

At 406, if the certificate of System A is unverified, User A may be prompted to accept the certificate to establish the TLS connection. This may include verification of certificate validity period, certificate chain issuer, certificate revocation lists, and the like.

At 408, user A device 301 may provide credentials to authenticate user A at system A.

For example, user A device 301 may provide user A's username and password or other authentication credentials to system A 102(A).

At 410, user A device 301 may implement a command for System A to join System B using credentials of a system B user, such as a username and password of a system B user, which may be an actual system B user, or which may be a one-time-use username and password for a fictitious system B user.

At 412, system A 102(A) may authenticate and authorize user A on system A, such as by checking user A's username and password or other authentication credentials provided to system A 102(A) at 408.

At 414, a system TLS connect or other type of secure connection is established between system A 102(A) and system B 102(B) via operations 416-422 below.

At 416, system A initiates a TLS or other secure connection with system B using a technique that may be similar to that discussed above at 404.

At 417, as a result of initiating the secure connection with system B, system A 102(A) may receive system B's public certificate.

At 418, if during the establishment of the secure connection, system B's certificate is not trusted by system A, system A may send a prompt to the user A device 301 to accept the certificate of system B. This may include verification of certificate validity period, certificate chain issuer, certificate revocation lists, and the like.

At 420, user A device may send a communication to system A 102(A) that acknowledges the validity of the certificate of system B.

At 422, a TLS or other secure connection is established between system A 102(A) and system B 102(B), which may include the establishment of a secure session key between system A 102(A) and system B 102(B).

At 424, system A now has a copy of system B's public certificate as a result of establishing the TLS connection.

At 426, system A sends a command to system B to join system A and system B in a trusted communication arrangement using the credentials of the system B user and the system A public certificate.

At 428, system B 102(B) authenticates and authorizes user B based on the user B credentials received from system A 102(A), and which system A 102(A) received from user A device 301 at 410.

At 430, system B 102(B) persists system A-B-C membership and certificate(s) at system B 102(B) and also to system C 102(C). For example, system B 102(B) and system C 102(C) may trust communications from system A 102(A) based on receiving system A's public certificate and the system B username and password for the system B user and the authentication performed by system B.

As indicated at 431, system C may receive a copy of system A's public certificate from System B during operation 430 discussed above.

At 432, system B 102(B) sends to system A 102(A) an acknowledgment that system A-B-C membership in a trusted communication relationship has been established.

At 434, system A now has a copy of system B's and system C's public certificates.

At 436, system A 102(A) may persist the system A-B-C membership and certificate(s).

At 438, system A 102(A) sends an acknowledgement to user A device 301 to acknowledge that the pairing for trusted communications between system A 102(A) and system B 102(B) and system C 102(C) has been established.

Accordingly, after the trusted communications have been established, systems A, B and C may comprise a federated computer system in which three separate systems have a trusted communication channel established between them.

Figure 5:
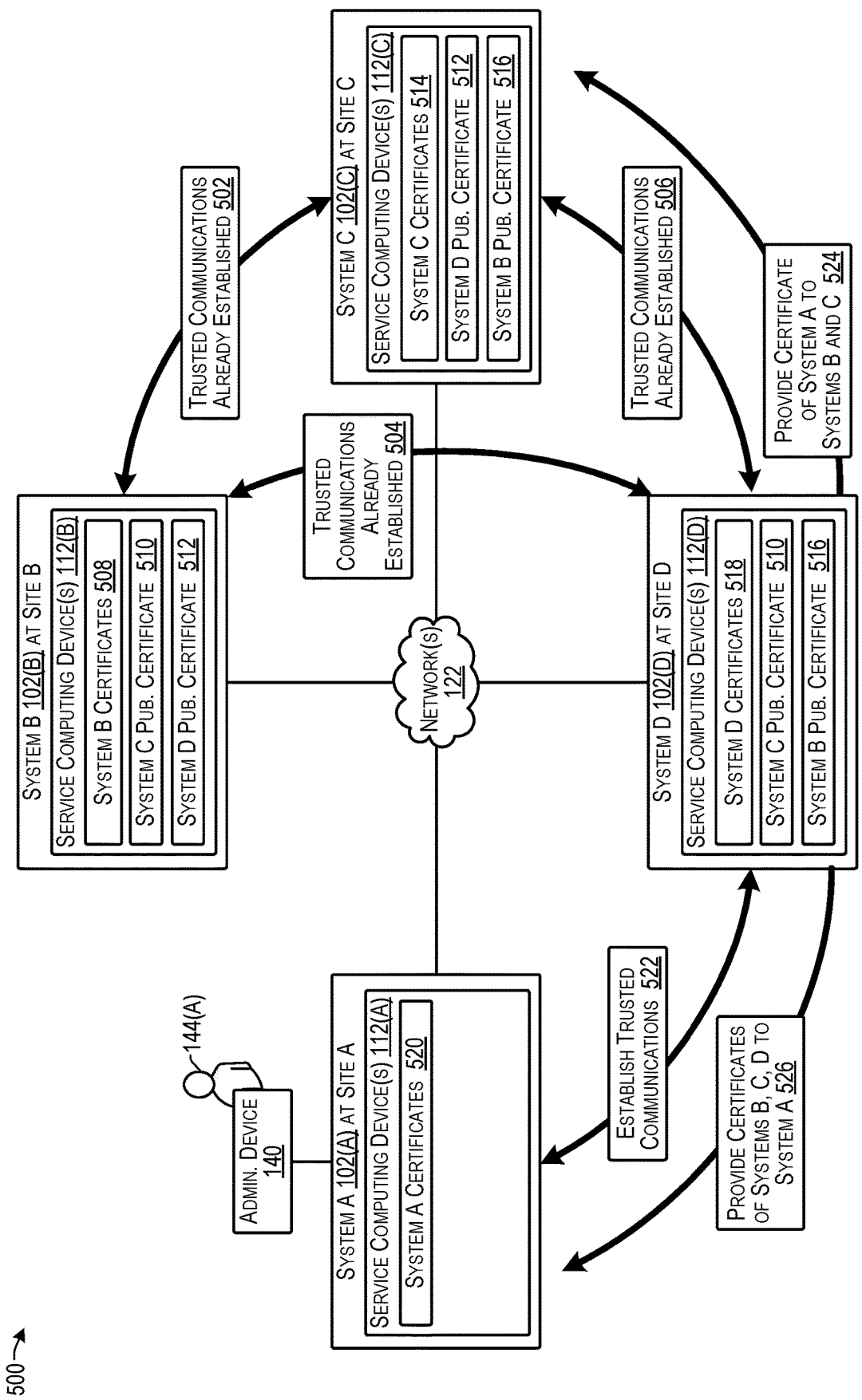
FIG. 5 is a block diagram illustrating an example configuration of a federated system according to some implementations.

FIG. 5 is a block diagram illustrating an example configuration of a federated system 500 according to some implementations. In this example, a distributed computer system includes system A 102(A) at site A, system B 102(B) at site B, system C 102(C) at site C, and system D 102(D) at site D, each including respective service computing devices 112(A)-112(D) in communication over the one or more networks 122. In some cases, at least some of sites A, B, C, and D may be geographically dispersed from each other, and/or the systems A, B, C, and D may be separate, autonomous, or otherwise distinct systems.

In this example, suppose that systems B, C, and D, having already gone through the process discussed above with respect to FIGS. 1-4 are already joined in a federation. Accordingly, as indicated at 502, trusted communications are already established between system B and system C; as indicated at 504, trusted communications are already established between system B and system D; and as indicated at 506, trusted communications are already established between system C and system D.

In addition, system B has its own system B certificates 508, as well as system C's public certificate 510, and system D's public certificate 512; system C has its own system C certificates 514, as well as system B's public certificate 516, and system D's public certificate 512; system D has its own system D certificates 518, as well as system B's public certificate 516, and system C's public certificate 510. Further, at this point, system A has only its own system A certificates 520.

The process that an administrator 144(A) or other authorized user may follow to join system A to the federation of systems B, C, and D is similar to that discussed above with respect to FIGS. 1-4. System A can be joined to any system B, C, or D that is already in the federation. For instance, suppose system D is selected as the target system for system A to establish two-way trusted communications. The administrator 144(A) may employ the process discussed above with respect to FIG. 4. According, as indicated at 522, trusted communications may be established between system A and system D as discussed above. Following the establishment of two-way trust, system D will have system A's public certificate, and may update the federation membership and provide all necessary certificates (e.g., system A's public certificate) to the federation, e.g., to systems B and C, as indicated at 524. In addition, as indicated at 526, system D may provide the certificates of systems B, C, and D to system A to establish bidirectional trust between all members of the federation, including system 102(A).

Figure 6:
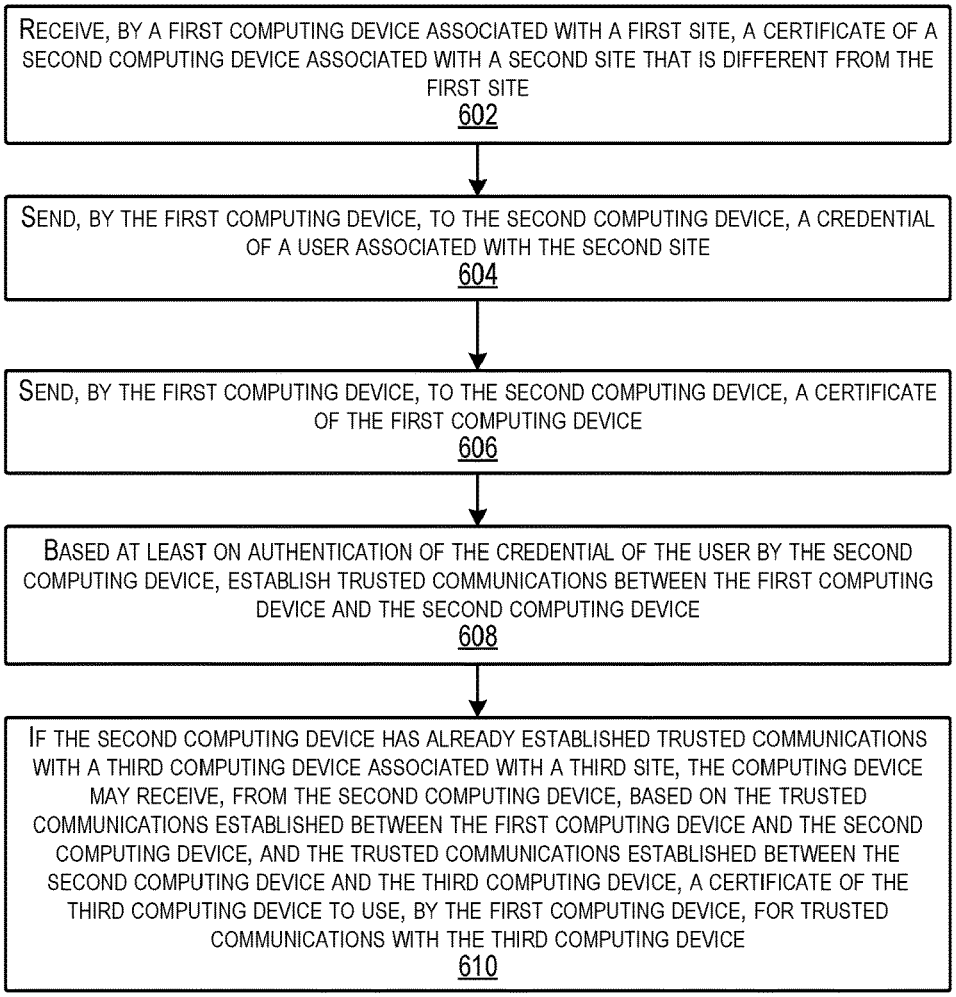
FIG. 6 is a flow diagram illustrating an example process for establishing trusted communications according to some implementations.

FIG. 6 is a flow diagram illustrating an example process for establishing trusted communications according to some implementations. The process is illustrated as a collection of blocks in a logical flow diagram, which represents a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the process is described with reference to the environments, frameworks, and systems described in the examples herein, although the process may be implemented in a wide variety of other environments, frameworks, and systems.

FIG. 6 is a flow diagram illustrating an example process 600 according to some implementations. In some cases, the process 600 may be executed at least in part by the one or more service computing devices 112.

At 602, the computing device may receive a certificate of a second computing device associated with a second site that is different from the first site.

At 604, the computing device may send to the second computing device, a credential of a user associated with the second site.

At 606, the computing device may send to the second computing device, a certificate of the first computing device. For instance, the certificate of the first computing device may be sent with or after the credential.

At 608, based at least on authentication of the credential of the user by the second computing device, the computing device may establish trusted communications between the first computing device and the second computing device.

At 610, if the second computing device has already established trusted communications with a third computing device associated with a third site, the computing device may receive, from the second computing device, based on the trusted communications established between the first computing device and the second computing device, and the trusted communications established between the second computing device and the third computing device, a certificate of the third computing device to use, by the first computing device, for trusted communications with the third computing device.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, the implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Figure 7:
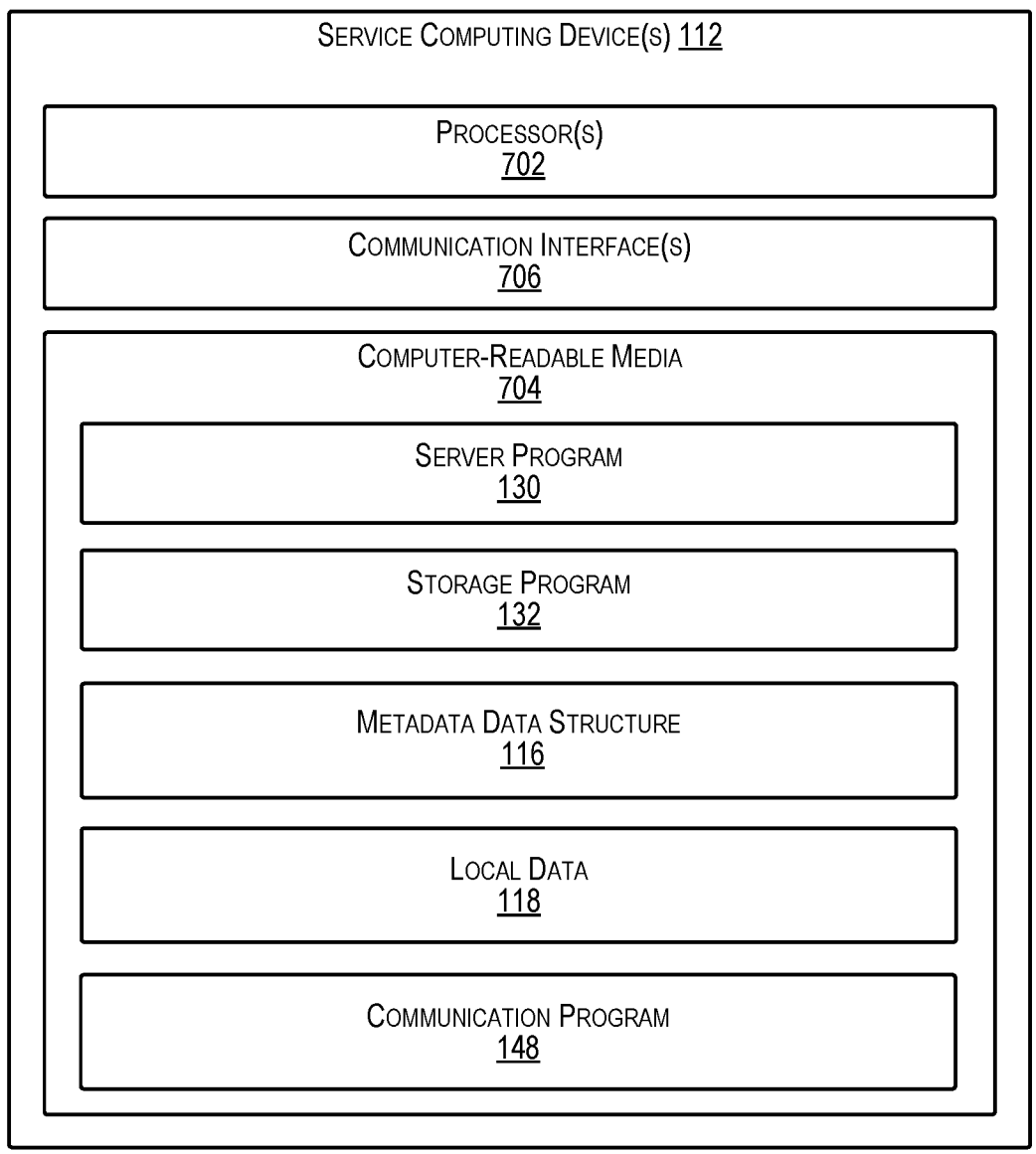
FIG. 7 illustrates select example components of a service computing device that may be used to implement at least some of the functionality of the systems described herein.

FIG. 7 illustrates select example components of a service computing device 112 that may be used to implement at least some of the functionality of the systems described herein. The service computing device 112 may include one or more servers or other types of computing devices that may be embodied in any number of ways. For instance, in the case of a server, the programs, other functional components, and data may be implemented on a single server, a cluster of servers, a server farm or data center, a cloud-hosted computing service, and so forth, although other computer architectures may additionally or alternatively be used. Multiple service computing devices 112 may be located together or separately, and organized, for example, as virtual servers, server banks, and/or server farms. The described functionality may be provided by the servers of a single entity or enterprise, or may be provided by the servers and/or services of multiple different entities or enterprises.

In the illustrated example, the service computing device 112 includes, or may have associated therewith, one or more processors 702, one or more computer-readable media 704, and one or more communication interfaces 706. Each processor 702 may be a single processing unit or a number of processing units, and may include single or multiple computing units, or multiple processing cores. The processor(s) 702 can be implemented as one or more central processing units, microprocessors, microcomputers, microcontrollers, digital signal processors, state machines, logic circuitries, and/or any devices that manipulate signals based on operational instructions. As one example, the processor(s) 702 may include one or more hardware processors and/or logic circuits of any suitable type specifically programmed or configured to execute the algorithms and processes described herein. The processor(s) 702 may be configured to fetch and execute computer-readable instructions stored in the computer-readable media 704, which may program the processor(s) 702 to perform the functions described herein.

The computer-readable media 704 may include volatile and nonvolatile memory and/or removable and non-removable media implemented in any type of technology for storage of information, such as computer-readable instructions, data structures, program modules, or other data. For example, the computer-readable media 704 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the service computing device 112, the computer-readable media 704 may be a tangible non-transitory medium to the extent that, when mentioned, non-transitory computer-readable media exclude media such as energy, carrier signals, electromagnetic waves, and/or signals per se. In some cases, the computer-readable media 704 may be at the same location as the service computing device 112, while in other examples, the computer-readable media 704 may be partially remote from the service computing device 112. For instance, in some cases, the computer-readable media 704 may include a portion of storage in the network storage 120 discussed above with respect to FIG. 1.

The computer-readable media 704 may be used to store any number of functional components that are executable by the processor(s) 702. In many implementations, these functional components comprise instructions or programs that are executable by the processor(s) 702 and that, when executed, specifically program the processor(s) 702 to perform the actions attributed herein to the service computing device 112. Functional components stored in the computer-readable media 704 may include the server program 130, the storage program 132, and the communication program 148, each of which may include one or more computer programs, applications, executable code, or portions thereof. For example, the server program 116 may provide communication functionality with the user devices and the network storage (not shown in FIG. 7). The storage program 118 may include a database management function for creating and managing the metadata data structure 116 containing metadata related to data stored and managed by the service computing device(s) 112. The communication program 148 may enable communications between the service computing device and other devices, such as secure communications based on trusted communication channels and certificates.

In addition, the computer-readable media 704 may store data, data structures, and other information used for performing the functions and services described herein. For example, the computer-readable media 704 may store the metadata data structure 116. In addition, the computer-readable media 704 may store local data 118, which may be data stored by the service computing device 112. The service computing device 112 may also include or maintain other functional components and data, which may include programs, drivers, etc., and the data used or generated by the functional components. Further, the service computing device 112 may include many other logical, programmatic, and physical components, of which those described above are merely examples that are related to the discussion herein.

The one or more communication interfaces 706 may include one or more software and hardware components for enabling communication with various other devices, such as over the one or more network(s) 106. For example, the communication interface(s) 706 may enable communication through one or more of a LAN, the Internet, cable networks, cellular networks, wireless networks (e.g., Wi-Fi) and wired networks (e.g., Fibre Channel, fiber optic, Ethernet), direct connections, as well as close-range communications such as BLUETOOTH®, and the like, as additionally enumerated elsewhere herein.

Various instructions, methods, and techniques described herein may be considered in the general context of computer-executable instructions, such as computer programs and applications stored on computer-readable media, and executed by the processor(s) herein. Generally, the terms program and application may be used interchangeably, and may include instructions, routines, modules, objects, components, data structures, executable code, etc., for performing particular tasks or implementing particular data types. These programs, applications, and the like, may be executed as native code or may be downloaded and executed, such as in a virtual machine or other just-in-time compilation execution environment. Typically, the functionality of the programs and applications may be combined or distributed as desired in various implementations. An implementation of these programs, applications, and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The invention claimed is:

1. A system comprising:
a first system including a plurality of first computing devices located at a first site, the first system in communication with a shared identity provider system that maintains user credential information for at least users of the first system and a second system, the second system including a plurality of second computing devices located at a second site that is different from the first site, at least one first computing device of the plurality of first computing devices in the first system including one or more processors configured by executable instructions to perform operations comprising:
  receiving, by the at least one first computing device, a certificate of the second system including the plurality of second computing a devices located at the second site that is different from the first site, the certificate of the second system including a public cryptographic key of the second system and an identity of the second system;
  in response to receiving the certificate of the second system, sending, by the at least one first computing device, to the second system, the certificate of the second system;
  in response to sending the certificate of the second system to the second system, receiving, from the second system a response signed with the certificate of the second system indicating that the first system can trust communications from the second system;
  obtaining, by the at least one first computing device, from the shared identity provider system, a credential of a user of the second system;
  in response to receiving the response signed with the certificate of the second system indicating that the first system can trust the second system, sending, by the at least one first computing device, the credential of the user of the second system to the second system, the second system redirecting the credential to the shared identity provider system for authentication, wherein the authentication indicates that the second system can trust communications from the first system;

sending, by the at least one first computing device, to the second system, a certificate of the first system, the certificate of the first system including a public cryptographic key of the first system and an identity of the first system, wherein, based at least on the at least one first computing device receiving the response signed with the certificate of the second system, and further based on authentication of the credential of the user of the second system, trusted communications are established between the first system and the second system.

2. The system as recited in claim 1, wherein the second system has already established trusted communications with a third system comprising a plurality of third computing devices located at a third site that is different from the first site and the second site, the operations further comprising:

receiving, from the second system, based on the trusted communications established between the first system and the second system, a certificate of the third system; and using, by the first system, the certificate of the third system for trusted communications with the third system.

3. The system as recited in claim 2, wherein the second system provides the certificate of the first system to the third system based on the trusted communications established between the first system and the second system, and the trusted communications already established between the second system and the third system.

4. The system as recited in claim 2, the operations further comprising:

receiving a revocation of the certificate of the first system;
obtaining a new certificate of the first system;
re-establishing trusted communications with the second system; and
sending the new certificate to the second system, wherein the second system provides the new certificate to the third system.

5. The system as recited in claim 2, wherein the shared identity provider system is further shared with the third system and maintains user credential information for users of the third system.

6. The system as recited in claim 1, further comprising, prior to receiving the certificate of the second system, initiating a transport layer security protocol connection with the second system to receive the certificate of the second system.

7. The system as recited in claim 1, the operations further comprising:

sending the certificate of the second system to a user device for acceptance of the certificate of the second system; and
receiving, from the user device, an acknowledgement indicating an acceptance of the certificate of the second system.

8. The system as recited in claim 1, wherein the credential of the user of the second system is a username and password of an administrator having authorized access to both the first system and the second system.

9. The system as recited in claim 1, wherein the public cryptographic key of the certificate of the first system corresponds to a private cryptographic key maintained by the first system.

10. The system as recited in claim 1, further comprising establishing, by the first system, trust in communications received from the second system based at least in part on receiving the response signed with the certificate of the second system; and sending the credential of the user to the second system based at least on the trust established by the first system based at least in part on receiving the response signed with the certificate of the second system.

11. The system as recited in claim 10, further comprising establishing the trusted communications between the first system and the second system based on the first system trusting communications from the second system based at least on receiving the response signed with the security certificate of the second system, and based on authentication of the credential of the second user by the shared identity provider system and receipt, by the second system, of the certificate of the first system.

12. A method comprising:

receiving, by a first computing device of a plurality of first computing devices included in a first system and located at a first site, a certificate of a second system, the second system comprising a plurality of second computing devices located at a second site that is different from the first site, the certificate of the second system including a public cryptographic key of the second system and an identity of the second system, wherein the first system and the second system are in communication with a shared identity provider system that maintains user credential information for at least users of the first system and the second system;

in response to receiving the certificate of the second system, sending, by the first computing device, to the second system, the certificate of the second system;

in response to sending the certificate of the second system to the second system, receiving, by the first computing device, from the second system, a response signed with the certificate of the second system indicating that the first system can trust communications from the second system;

obtaining, by the first computing device, from the shared identity provider system, a credential of a user of the second system;

in response to receiving the response signed with the certificate of the second system, sending, by the first computing device, to the second system, the credential of the user of the second system, the second system redirecting the credential to the shared identity provider system for authentication, wherein the authentication indicates that the second system can trust communications from the first system; and sending, by the first computing device, to the second system, a certificate of the first system, a certificate of the first system including a public cryptographic key of the first system and an identity of the first system, wherein, based at least on the first computing device receiving the response signed with the certificate of the second system, and further based on authentication of the credential of the user of the second system, trusted communications are established between the first system and the second system.

13. The method as recited in claim 12, wherein the second system has already established trusted communications with a third system including a plurality of third computing devices located at a third site, the method further comprising:

receiving, from the second system, based on the trusted communications established between the first system and the second system, a certificate of the third system; and using, by the first system, the certificate of the third system for trusted communications with the third system.

14. The method as recited in claim 13, wherein the second system provides the certificate of the first system to the third system based on the trusted communications established between the first system and the second system, and the trusted communications already established between the second system and the third system.

15. The method as recited in claim 12, further comprising, prior to receiving the certificate of the second system, initiating, by the first computing device, a transport layer security protocol connection with the second system to receive the certificate of the second system.

16. The method as recited in claim 12, wherein the credential of the user of the second system is a username and password of an administrator having authorized access to both the first system and the second system.

17. One or more non-transitory computer-readable media storing instructions that, when executed by a first computing device of a plurality of computing devices included in a first system and located at a first site, configure the first computing device to perform operations comprising:

receiving, by the first computing device, a certificate of a second system, the second system comprising a plurality of second computing devices located at a second site that is different from the first site, the certificate of the second system including a public cryptographic key of the second system and an identity of the second system, wherein the first system and the second system are in communication with a shared identity provider system that maintains user credential information for at least users of the first system and the second system;

in response to receiving the certificate of the second system, sending, by the first computing device, to the second system, the certificate of the second system;

in response to sending the certificate of the second system to the second system, receiving, by the first computing device, from the second system, a response signed with the certificate of the second system indicating that the first system can trust communications from the second system;

obtaining, by the first computing device, from the shared identity provider system, a credential of a user of the second system;

in response to receiving the response signed with the certificate of the second system, the credential of the user of the second system, the second system redirecting the credential to the shared identity provider system for authentication, wherein the authentication indicates that the second system can trust communications from the first system; and sending, by the first computing device, to the second system a certificate of the first system, the certificate of the first system including a public cryptographic key of the first system and an identity of the first system, wherein, based at least on the first system receiving the response signed with the certificate of the second system, and further based on authentication of the credential of the user of the second system, trusted communications are established between the first system and the second system.

18. The one or more non-transitory computer-readable media as recited in claim 17, wherein the second system has already established trusted communications with a third system including a plurality of third computing devices located at a third site, the operations further comprising:

receiving, from the second system, based on the trusted communications established between the first system and the second system, a certificate of the third system; and using, by the first system, the certificate of the third system for trusted communications with the third system.

19. The one or more non-transitory computer-readable media as recited in claim 18, wherein the second system provides the certificate of the first system to the third system based on the trusted communications established between the first system and the second system, and the trusted communications already established between the second system and the third system.

20. The one or more non-transitory computer-readable media as recited in claim 17, wherein the credential of the user of the second system is a username and password of an administrator having authorized access to both the first system and the second system.

* * * * *